United States Patent [19]
Davidson

[11] 3,815,110
[45] June 4, 1974

[54] WARNING ALARM FOR PROVIDING AN ALARM UPON OPERATING MEANS BEING UNINTENTIONALLY CONNECTED TO A POWER SOURCE

[76] Inventor: Sidney Davidson, 1 Lockhern Dr., Livingston Township, Essex County, N.J.

[22] Filed: Mar. 23, 1972

[21] Appl. No.: 237,296

Related U.S. Application Data
[63] Continuation-in-part of Ser. No. 7,887, Feb. 2, 1970, abandoned.

[52] U.S. Cl. ........ 340/213 R, 307/10 BP, 340/52 D
[51] Int. Cl. ........................................... G08b 21/00
[58] Field of Search ............ 340/52 D, 52 R, 213 R; 307/10 BP, 10 LS, 252 O, 252 L, 252 B, 252 R

[56] References Cited
UNITED STATES PATENTS
| | | | |
|---|---|---|---|
| 2,507,398 | 5/1950 | Castro | 340/52 D |
| 2,756,408 | 7/1956 | McKaig | 340/52 D |
| 2,799,843 | 7/1957 | Savino | 340/52 D |
| 2,942,235 | 6/1960 | Warhurst | 340/52 D |
| 3,068,460 | 12/1962 | Uhrig et al. | 340/52 R |
| 3,623,153 | 11/1971 | Hayden | 340/52 D |

*Primary Examiner*—John W. Caldwell
*Assistant Examiner*—Glen R. Swann, III
*Attorney, Agent, or Firm*—Popper, Bain, Bobis, Gilfillan

[57] ABSTRACT

A warning alarm for providing an alarm upon first switch means being operated including an alarm device includes, a first solid state device electrically associated with a first switch and an alarm device for completing an energization path for the alarm device upon being operated. The first solid state device has a gate for receiving current for operating the first solid state device upon operation of the first switch. A second solid state device is electrically associated with the first switch, a second switch and the first solid state device. The second solid state device has a gate for receiving current for operating the second solid state device upon operation of the second switch. The second solid state device, when operated, shunts the gate of the first solid state device to preclude operation of the first solid state device and thereby interrupts the energization path for the alarm device.

4 Claims, 5 Drawing Figures

3,815,110

WARNING ALARM FOR PROVIDING AN ALARM UPON OPERATING MEANS BEING UNINTENTIONALLY CONNECTED TO A POWER SOURCE

RELATED APPLICATIONS

This application is a continuation-in-part of patent application Ser. No. 7,887 filed Feb. 2, 1970 in the name of Sidney Davidson as inventor and now abandoned.

BACKGROUND OF THE INVENTION

In automobile circuits it is common to provide a buzzer or alarm devices to warn the driver when he opens the door with the ignition in either the on position or in some instances even if the key remains in the ignition lock. This type of alarm device is suitable as far as it goes. However, many motorists tend to leave parking lights or even main headlights on when departing from the vehicle which depletes the battery. The same situation is possible in certain automobiles when a radio or some other accessory device in the automobile powered by its battery is left energized when the vehicle is left unattended.

Almost invariably, the driver will turn the ignition off before leaving the vehicle since this is necessary to shut off the engine. Therefore, it is desirable to employ the ignition switch in the "off" position as a governing element to control warning devices to inform the driver that other accessories are on when he departs the vehicle.

Common buzzers are well known and may be adapted to the ordinary automobile electrical circuitry to sound when the vehicle's ignition is in the "off" positon and one or more governed accessories are still on. Generally, however, this includes the use of a common relay either of an electro mechanical variety or of a solid state variety.

In the automotive industry, even very slight increase in cost of manufacture is vital because of the volume involved. Therefore, it is emcumbent to simplify electrical circuitry to insure minimum cost. In the instant situation, it would be desirable to eliminate one of the relatively costly circuit elements, the relay. In the case of an electro mechanical relay, it is advantageous to eliminate this to avoid a potential element of malfunction.

One embodiment of the present invention relates to a circuit which will warn the driver by means of some alarm device such as a buzzer that one or more governed accessories are energized when the ignition has been switched to the "off" position. In the particular circuit described and claimed herein, the common buzzer is employed as both the relay and the alarm.

While the present application will describe a specific embodiment of the invention as applied to an automobile ignition, the claims should be interpreted broadly to include any alarm application whether energized by alternating current or direct current, there being slight modifications in the circuit to accommodate each.

SUMMARY OF INVENTION

A warning alarm for providing an alarm upon operating means being unintentionally connected to a power source including switch means, control means connected to the switch means, alarm means connected to the switch means and the operating means, upon the operating means being unintentionally connected to the power source and upon said switch means being unclosed, said alarm means providing an alarm to indicate said condition of said operating means.

BRIEF DESCRIPTION OF THE DRAWINGS

The objects and advantages aforesaid as well as other objects and advantages may be achieved by the alarm claimed herein, two preferred embodiments of which are illustrated in the drawings in which:

DESCRIPTION OF THE PREFERRED EMBODIMENT

Figure 1:
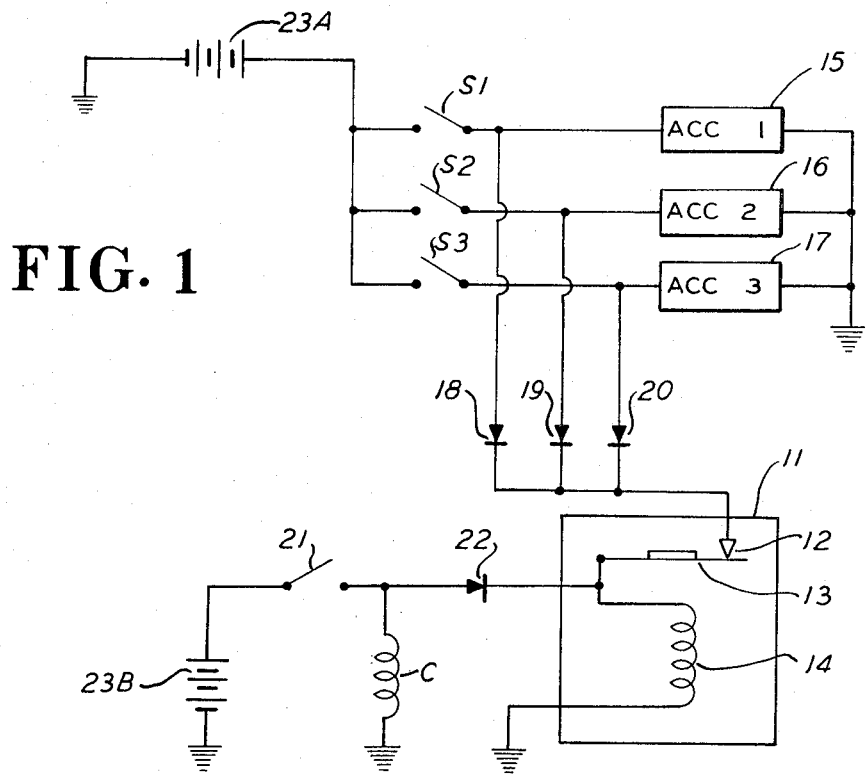
FIG. 1 is a schematic for an alarm employing a DC power source.

Referring now to the drawing in detail and in particular to FIG. 1, the alarm comprises an ordinary buzzer 11 including a normally closed switch 12 connected to an armature 13 which is spring-mounted above a coil 14.

A plurality of operating means such as automobile accessories as indicated, 15, 16 and 17 are connected to the normally closed switch 12 in the buzzer 11. The elements 15, 16 and 17 may be such things as the parking lights, the main headlights, a radio or any other accessory device in an automobile which one desires to protect and which accessories may be selectively connected to or disconnected by switches S1, S2 and S3 from a DC power source 23A which may be the same as, or which may be different from or independent of, DC power source 23B. Each of the accessories 15, 16 and 17 are isolated from each other by diodes 18, 19 and 20, respectively.

The governing switch 21 may be, for example, the ignition switch for an automobile ignition coil C or other control means. A diode 22 is connected intermediate the switch 21 and the armature 13 to isolate the control means, e.g. ignition coil C, from the controlled circuits, e.g. accessories 15, 16 and 17, to prevent energization of the control means through the switch 12. If the specific alarm circuit does not include any control means, e.g. ignition coil C, no diode 22 will be required. Also, in the event that power supplies 23A and 23B are different power supplies, or provide different voltages, an isolating diode 22 will be required to isolate the different power supplies during any interval of time that switches 21 and 12 are both closed.

In operation, if the ignition switch 21 is in the "on" or closed position, the coil 14 of buzzer 11 is energized on a continuous basis drawing the armature into engagement therewith opening the switch 12 and thereby rendering the buzzer silent. However, when the governing switch 21 is in the open or "off" position, the coil 14 is normally deenergized and normally closed switch 12 closed. Nevertheless, in the event that one or more of the operating means or accessories 15, 16 or 17 is energized current passes through isolating diodes 18, 19 or 20, respectively, to the switch 12 of the buzzer 11. In the usual manner in which such buzzer alarms function, this generates a buzzing sound by oscillatory motion of the armature 13. Therefore, the automobile operator would be warned that one or more of the operating means or accessories such as the headlights, parking lights or the radio was on when his ignition was turned off, ostensibly to depart from the vehicle.

However, in the event that one wishes to operate one or more of the operating means or accessories while the ignition switch of the vehicle is off, the switch is set to the accessory position (not shown) which can close governing switch 21.

Figure 2A:
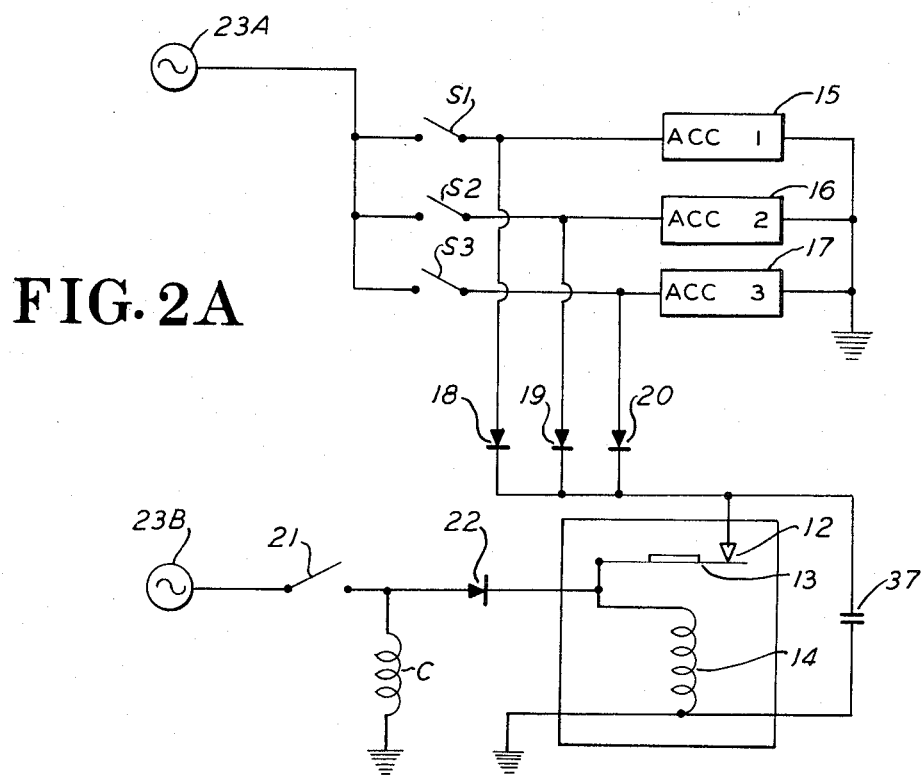
FIGS. 2A and 2B are schematics of alarms employing an AC power source.
Figure 2B:
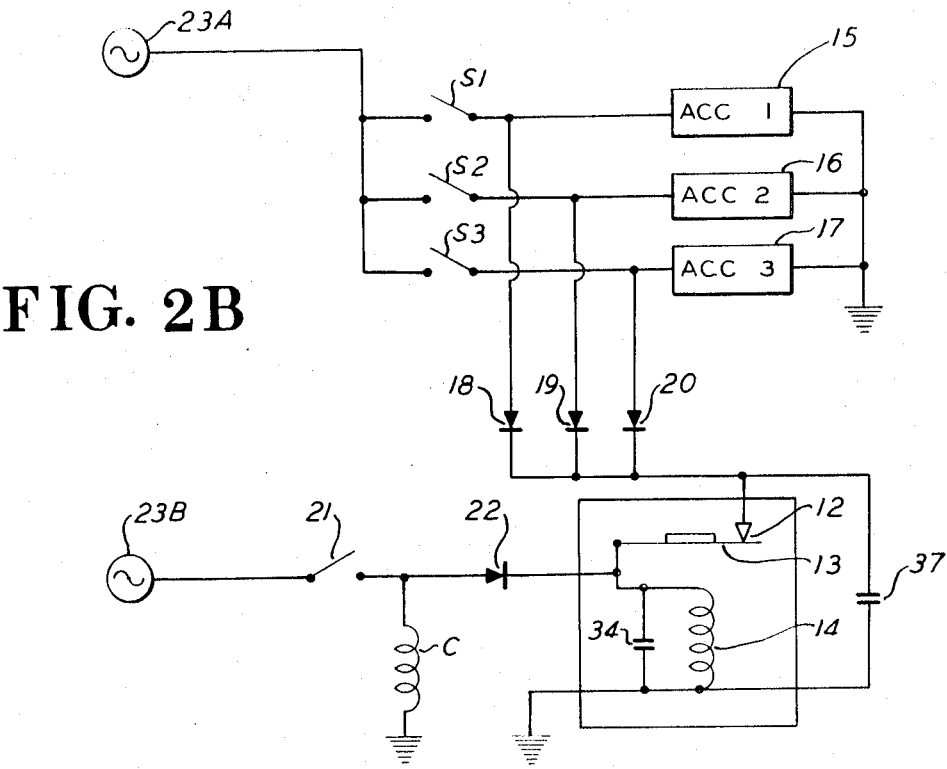

In the case of an alternating current power supply, the circuit diagrams illustrated in FIGS. 2A or 2B may be employed which includes a buzzer 11 having a normally closed switch 12 and an armature 13 influenced by a coil 14. The switch 21 may be identical to governing switch 21 in FIG. 1.

As will be noted from FIGS. 2A and 2B, the embodiment of FIG. 2B includes a capacitor 34 and the embodiment of FIG. 2A does not include capacitor 34. Diode 22 provides the same isolating function as taught above with regard to diode 22 in FIG. 1. However, the embodiment of FIG. 2A includes a capacitor 37 connected between the isolating diodes 18, 19 and 20 and ground. This capacitor filters the current from diodes 18, 19 and 20 to provide a DC at switch 12 of the buzzer 11. The inclusion or exclusion of capacitor 34 depends upon the characteristics of the coil 14 of the buzzer 11. If the characteristics of coil 14 are such that upon the closure of switch 21 it will respond to the pulsating DC from diode 22 and attract the armature 13 without humming of the buzzer 11, the embodiment of FIG. 2A may be used and capacitor 34 need not be included. If, however, the coil 14 will respond to the pulsating DC or individual half cycles or halfwave rectified signal provided by the diode 22, i.e. hums, the capacitor 34 in addition to the diode 22 is provided to filter or smooth out the rectified AC provided by diode 22, and hence the embodiment of FIG. 2B will be employed.

The AC power source 23B may be the same as, or may be different from, AC power source 23A. The operating means or accessories 31, 32 and 33 may be selectively connected to or disconnected from AC power source 23A by switches S1, S2 and S3. Upon switch 21 being opened, and upon any of the AC accessories 15, 16, or 17 being unintentionally connected to the AC power source 23A, AC power from source 23A is passed through such accessory, is rectified by the respective diodes 18, 19 or 20 into pulsating DC current which is received by the capacitor 37 whereby the pulsating DC is smoothed. Energization of the coil attracts the armature thereby opening the switch 12 which in turn interrupts the DC current received by the coil through switch 12 thereby releasing the armature 13 which again closes the switch 12. Reclosure of the switch 12 causes the DC current derived through one of the accessories 15, 16 or 17 to be again applied to energize the coil 14. The energization and deenergization of coil 14 continues so long as one of the AC accessories is substantially connected to AC power source 23B and the switch 21 remains open, and during such repeated energization and deenergization of the coil 14, the armature 13 generates an audible buzzing sound due to its oscillatory motion as in the embodiment of FIG. 1.

Figure 3:
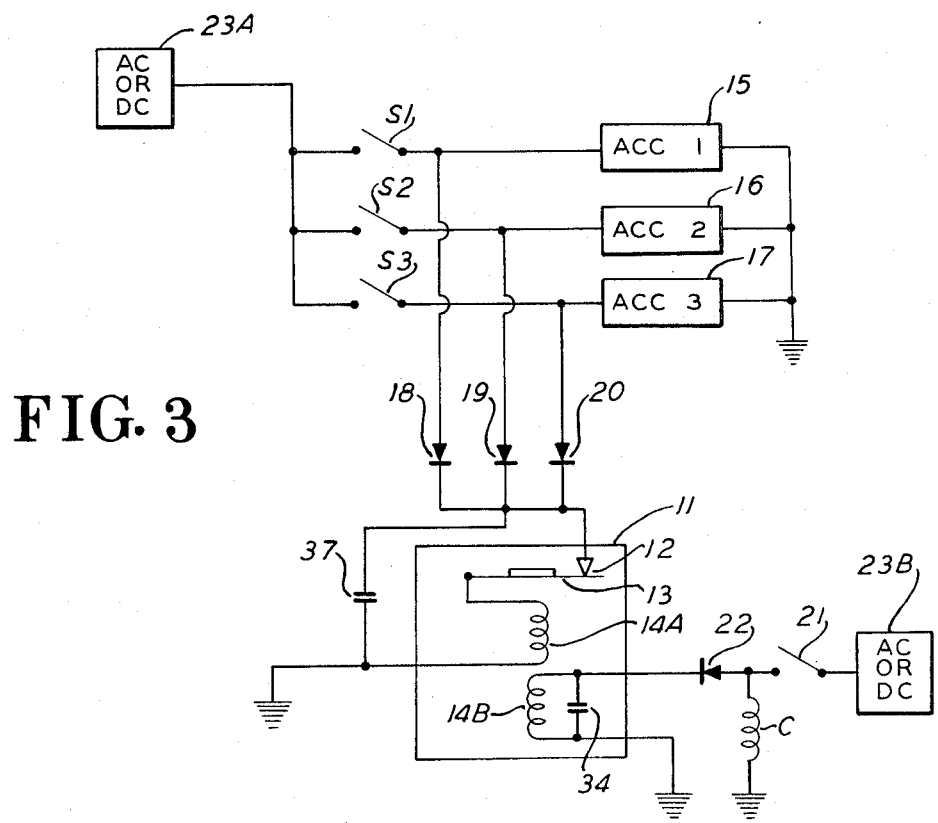
FIG. 3 is a schematic for an alarm provided with either an AC or DC power source in which a double coil is employed.

Alternately, the ignition switch 21 of FIGS. 1 and 2, may be isolated from the operating means or accessories by means of a double coil circuit illustrated in FIG. 3.

The governed accessories 15, 16 and 17 are connected to a buzzer 11 in the same manner as illustrated in FIGS. 1 and 2, being isolated from each other by diodes 18, 19 and 20, respectively.

The normally closed switch 12 of buzzer 11 is connected to coil 14A. However, the governing switch 21 is isolated from the governed accessories 15, 16 and 17 by the second coil 14B. In operation, when the governing switch 21 is closed coil 14B holds switch 12 open so that the buzzer 11 is inoperative. However, if the governing switch 21 is open and one or more of the governed accessories 15, 16 or 17 is energized, the buzzer 11 is energized. The embodiment of FIG. 3 may be operated in the DC mode as in FIG. 1 or in the AC mode as in FIG. 2 but in either mode the coil 14 of FIGS. 1 and 2 is split into two separate and independent coils 14A and 14B in the embodiment of FIG. 3. When operated in the DC mode, rectifying capacitors 34 and 37 would not be required and the diodes 18, 19 and 20 would perform the same isolating function as diodes 18, 19 and 20 of FIG. 1, isolating diode 22 would perform the same function as diode 22 of FIG. 1. When operated in the AC mode, the diodes 18, 19 and 20 perform the same function as the isolating diodes 18, 19 and 20 of FIG. 2 and the capacitor 37 would perform the same smoothing function as capacitor 37 of FIG. 2. It will be further understood that the embodiment of FIG. 3 when operated in the AC mode may or may not include the capacitors 34 and the diode 22 depending upon the characteristics of the coil 14B as taught above with regard to the embodiments of FIG. 2B. Independent coils 14A and 14B permit the operating means 15, 16 and 17 and the governing means or control means, e.g. ignition coil C to be operated by different power sources and different voltages, a common problem in alarm or control circuits.

Figure 4:
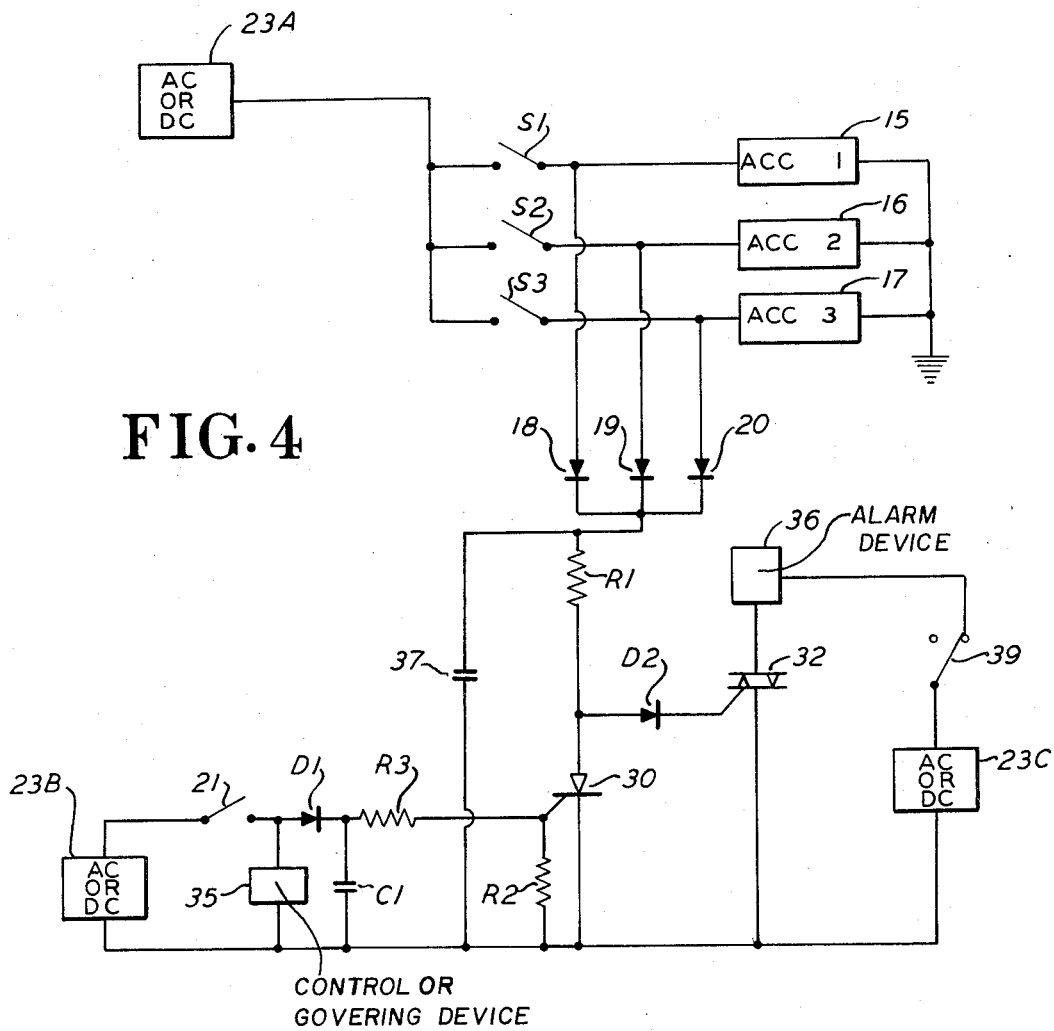
FIG. 4 is a schematic of an alarm employing a solid state device as switching means.

Referring now to FIG. 4, there is shown a still further embodiment of the present invention which employs a solid state device such as the SCR 30, and wherein circuit elements identical to those shown in the other FIGURES are given identical reference designations.

The power sources 23A, 23B and 23C may be the same or different power supplies and may be either AC or DC. If power supply 23B is AC, diode D1 and capacitor C1 are included, and if power source 23A is AC, capacitor 37 is included. If power source 23C is AC, the solid state device 32 may be a Triac, and if power supply 23C is a DC power supply, the solid state device 32 may be an SCR as device 30. Operation of the device 32 completes an energization path for the alarm device 36 from the power source 23C; the alarm device 36 may be an audible alarm device such as a buzzer or bell, or may be a visible alarm device such as a light or may be both. If power source 23C is DC a normally closed switch 39 is needed to extinguish 32 and turn off alarm 36.

The alarm circuit of FIG. 4 operates in the following manner, upon switch 21 being closed, for example to operate a control or governing device 35 current from power source 23B is supplied to the gate of the SCR 30 through coupling resistor R3 to fire or turn the SCR 30 on and thereby shunt or short out the gate of solid state device 32 and thereby prevent the gate of device 32 from receiving current from power supply 23A, any of diodes 18, 19 or 20 and current limiting resistor R1, upon any of the switches S1, S2 or S3 being closed upon the operation of any of the controlled devices 15, 16 and 17. Upon the switch 21 being opened thereby rendering the SCR 30 inoperative or non-conductive, and upon any one of the switches S1, S2 or S3 being unintentionally closed, current from power source 23A will be applied to the gate of the solid state device 32 to operate the alarm device 36 as described above.

The diode D2 is connected in series with the gate of the solid state device 32 to provide the same, or substantially the same, voltage drop thereacross as is across SCR 30 when conducting, such voltage drop across diode D2 precluding the solid state device 32 from firing when the SCR 30 is fired or is conducting.

It will be understood that many modifications may be made in the present invention without departing from the spirit and scope thereof.

What is claimed is:

1. A warning alarm for providing an alarm upon first switch means being operated, comprising:
   a. an alarm device for providing said alarm upon being operated;
   b. a first solid state device electrically associated with said first switch means and said alarm device and for completing an energization path for said alarm device upon being operated, said solid state device having a gate for receiving current for operating said first solid state device upon said first switch means being operated;
   c. second switch means; and
   d. a second solid state device electrically associated with said first switch means, said second switch means and said first solid state device, said second solid state device having a gate for receiving current for operating said second solid state device upon said second switch means being operated, said second solid state device upon being operated shunting said gate of said first solid state device to preclude operation of said first solid state device thereby interrupting said energization path for said alarm device.

2. A warning alarm according to claim 1 further including a diode connected between said second solid state device and said gate of said first solid state device and for providing a voltage drop thereacross substantially equal to the voltage drop across said second solid state device when operated thereby precluding operation of said first solid state device upon the operation of said second solid state device.

3. A warning alarm according to claim 1 wherein said first solid state device is a Triac.

4. A warning alarm according to claim 1 wherein said first and second solid state devices are SCR's.

* * * * *